United States Patent

Wu

[11] Patent Number: 5,897,129
[45] Date of Patent: Apr. 27, 1999

[54] GOLF CART FOOT UNIT

[75] Inventor: Fang-Li Wu, Tainan Hsien, Taiwan

[73] Assignee: Sports World Enterprise Co., Ltd., Tainan Hsien, Taiwan

[21] Appl. No.: 08/755,371

[22] Filed: Nov. 25, 1996

[51] Int. Cl.[6] ........................................ B62B 1/00
[52] U.S. Cl. ........................... 280/646; 280/DIG. 6
[58] Field of Search ........................ 280/646, 645, 280/651, 652, 47.24, 47.26, DIG. 6; D34/15

[56] References Cited

U.S. PATENT DOCUMENTS

| D. 303,028 | 8/1989 | Lee | D34/15 |
|---|---|---|---|
| 3,807,751 | 4/1974 | Jeninga | 280/646 |
| 5,087,040 | 2/1992 | Wu | 280/646 |
| 5,201,540 | 4/1993 | Wu | 280/646 |
| 5,409,253 | 4/1995 | Cheng | 280/646 |
| 5,496,054 | 3/1996 | Wu | 280/646 |
| 5,582,421 | 12/1996 | Liu | 280/646 |

*Primary Examiner*—Robert J. Oberleitner
*Assistant Examiner*—Pamela J. Lipka
*Attorney, Agent, or Firm*—Rosenberg, Klein & Bilker

[57] ABSTRACT

A golf cart foot unit includes an upper rod and a lower rod combined together. The upper rod and the lower rod have the same structure wherein they have a plurality of projecting walls and plural grooves defined by the walls on their inner surfaces. The walls and the grooves of the upper rod fit with the grooves and the walls of the lower rod with substantial dimensions so that the foot unit has a considerable stability in operation of collapsing and spreading of the golf cart.

1 Claim, 3 Drawing Sheets ic connection, extending between said connecting plate and said wheel assembly; and,

GOLF CART FOOT UNIT

BACKGROUND OF THE INVENTION

This invention concerns a golf cart foot unit, particularly consisting of an upper rod and a lower rod combined together by means of plural projecting walls and grooves formed by the walls to fit with one another so as to enable the foot unit spread or collapse smoothly and increase the golf cart strength as well.

A common known conventional golf cart shown in FIG. 4 includes a club bag frame 11, a pair of foot units 12, two wheels 13, and a push rod 14 as main components combined together.

An upper supporter 111 and a lower supporter 112 are fixed on the club bag frame 11 for a band to bind a club bag 15 on the frame 11, and a sustainer 113 under the lower supporter 112 to sustain the bottom of the bag 15.

Further, a connecting plate 114 is movably fixed on the club bag frame 11, and combined with upper ends of the foot units 12 at two sides. Then lower ends of the foot units 12 are combined pivotally with pivots 121 with plates 131 fixed on the wheels 13 so as to enable the wheels to move on the ground. Then the upper and the lower rod 122 and 123 form a parallelogram. Further, a support rod 116 connects pivotally the lower end 123 with the upper supporter 111 so that the foot unit 12 can swing inward to collapse or outward to spread. And a push rod 14 is provided movable rearward and bendable downward, having a grip 141 and a record plate 142.

Though the known conventional golf cart has advantages of light weight and easy collapsiblity, it also has disadvantages as follows in use.
1. The upper rod and the lower rod of the foot unit are considerably loose in the combined condition, and will become quite looser after a period of use. So the whole golf cart will hardly work soon.
2. A golf cart should have enough stability to move around on a golf ground with many uneven surfaces, and this conventional golf cart does not have that.

SUMMARY OF THE INVENTION

A main purpose of the invention is to offer a golf cart foot unit consisting of an upper rod and a lower rod combined together by means of projecting walls and grooves formed by the walls to fit with one another so that the foot unit may move securely in collapsing and spreading, without swaying around.

Another purpose of the invention is to provide a structure for increasing strength of the foot unit and effectively reducing wear of the pivotal connection, the upper rod and the lower rod of the foot unit are provided with the projecting walls and the grooves defined by the walls to fit with one another with substantial dimensions to contact with one another when they are combined together to constitute the foot unit.

BRIEF DESCRIPTION OF DRAWINGS

This invention will be better understood by referring to the accompanying drawings, wherein.

DESCRIPTION OF THE PREFERRED EMBODIMENT

Figure 1:
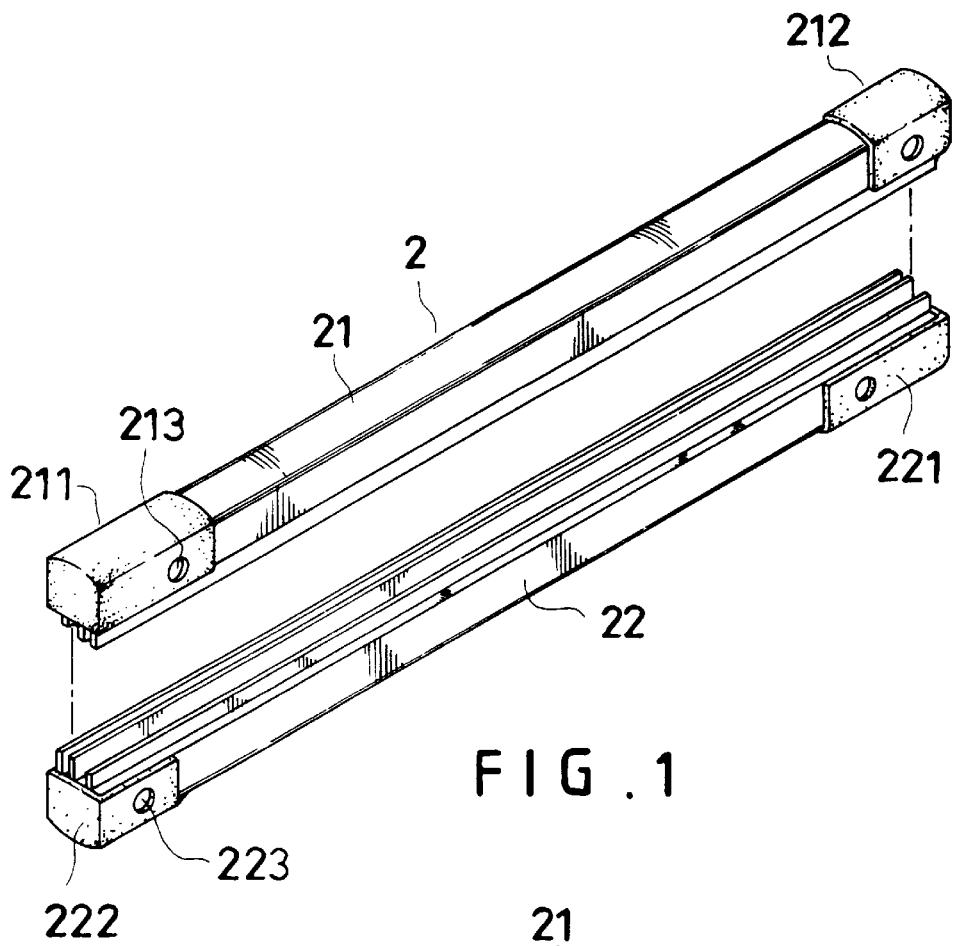
FIG. 1 is an exploded perspective view of a golf cart foot unit in the present invention.

A preferred embodiment of a golf cart foot unit 2 in the present invention, as shown in FIG. 1, includes an upper rod 21 and a lower rod 22 combined together.

Figure 2:
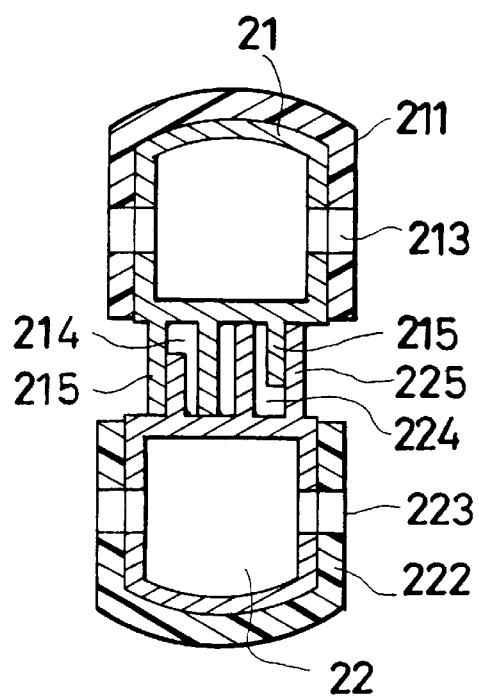
FIG. 2 is a cross-sectional view of the golf cart foot unit in the present invention.

Both the upper rod 21 and the lower rod 22 respectively have two ends covered with a long end housing 211, 221 with a sidewise hole 213 and a short end housing 212, 222 with a sidewise hole 223, and plural longitudinal vertical walls 215, 225 spaced apart to project down (for the upper rod 21) or project up (for the lower rod 22) to define plural longitudinal grooves 214, 224. Then the walls 215 and the grooves 214 of the upper rod fit with the grooves 224 and the walls 225 of the lower rod when the upper and the lower rod 21 and 22 are combined together, slidable against each other, as shown in FIG. 2.

Then the two foot units 2, 2 are combined pivotally with a club bag frame 11 by means of a connecting plate 114, and with two wheels 13, 13 by means of two plates 131, 131.

Figure 3:
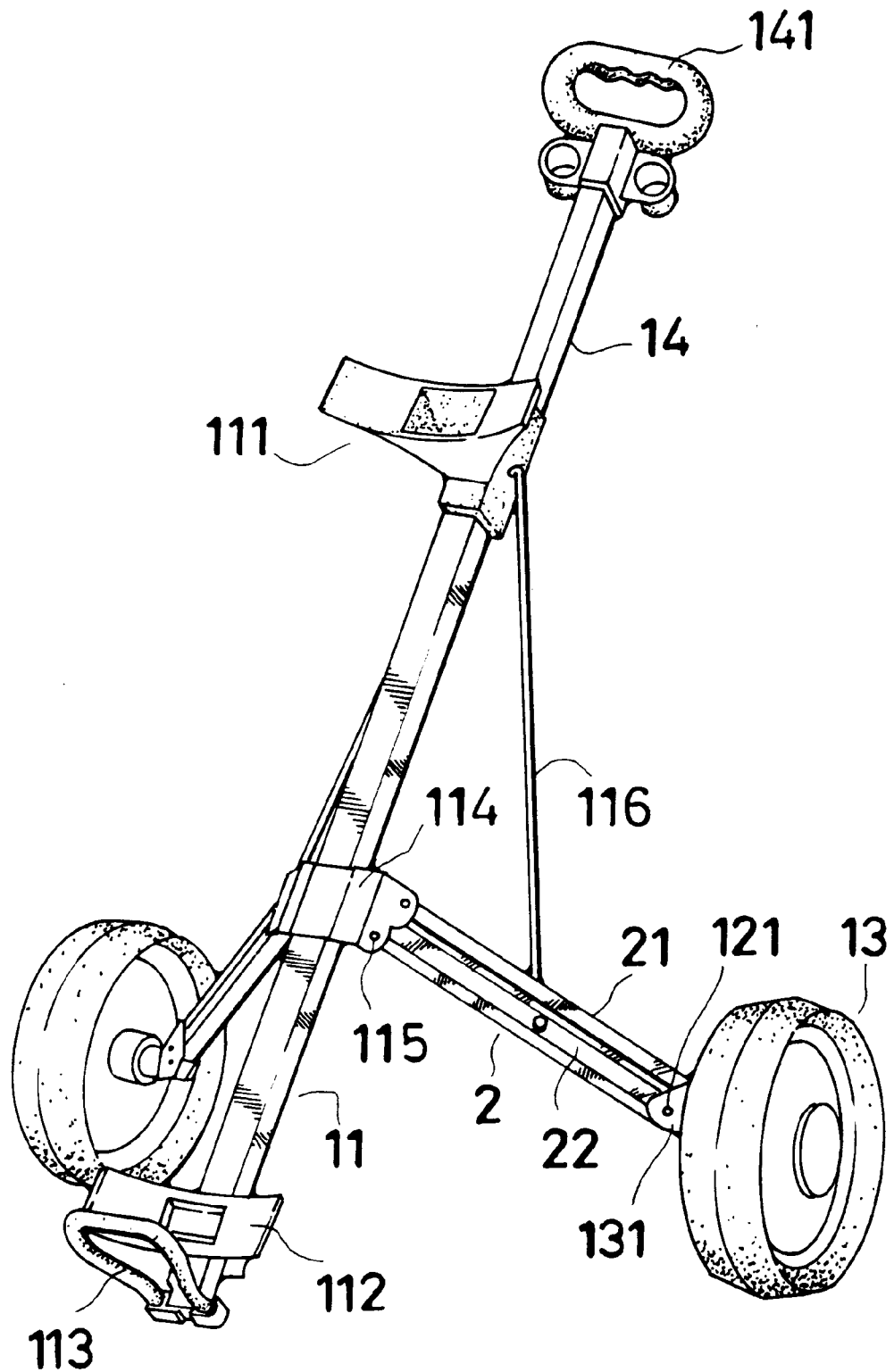
FIG. 3 is a perspective view of the golf cart foot unit in the present invention, showing it combined with other components to form a complete golf cart; and, FIG. 4 is a perspective view of a known conventional golf cart foot unit.
Figure 4:
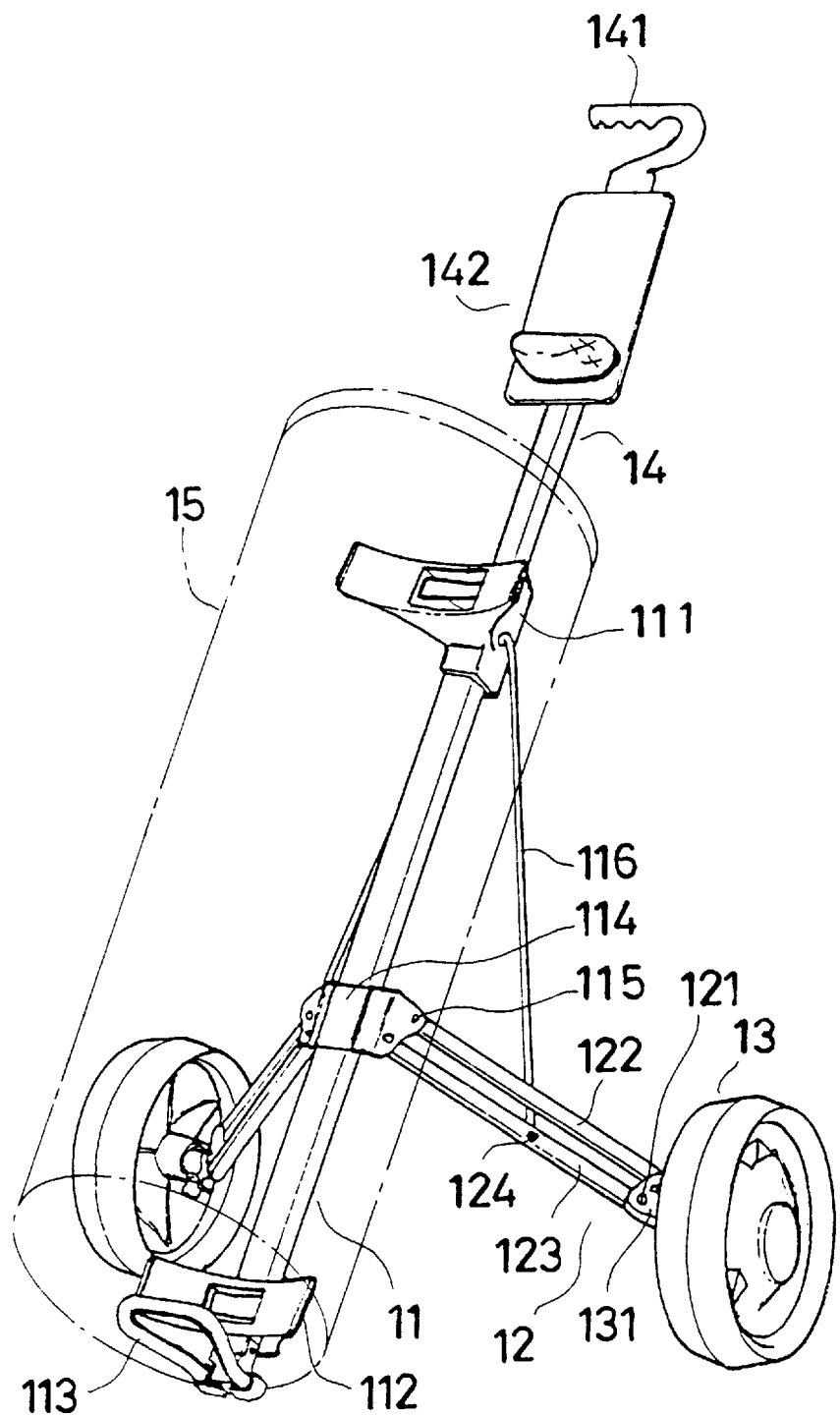

Referring to FIG. 3, the foot unit 2 in the present invention is combined with a golf cart, and support connecting rods 116, 116 are pivotally combined between an upper supporter 111 and the foot unit 2. Then the present invention has the same functions as the known conventional golf cart foot unit, and other advantages the latter does not have, as described below.
1. The projecting walls and the grooves defined by the walls are effective for the upper and the lower rod to enable them to combine with each other with proper securing tightness and with substantial dimensions, preventing them both from swaying, and thus increasing stability of the golf cart and load to bear.
2. The projecting walls and the grooves of the upper and the lower rod always contact with one another with definite certain dimensions, without separating from each other, whether the foot units are in a collapsing or a spreading movement or in operating movement. Therefore, the foot units have substantial stability after being combined together, even when the golf cart moves on the ground so that the connecting pivots may reduce wear from swaying, and service life and value of the golf cart may be augmented.
3. Only one mold is enough to make the upper and the lower rod, as they have the same structure, saving the cost.

While the preferred embodiment has been described above, it will be recognized and understood that various modifications may be made therein and the appended claims are intended to cover all such modifications which may fall within the spirit and scope of the invention.

What is claimed is:
1. A foot unit assembly for retractably coupling a wheel assembly to a connecting plate slidably coupled to an elongate club bag frame in a collapsible golf bag cart, said foot unit assembly comprising:
   (a) an elongate first rod member pivotally coupled to and extending between said connecting plate and said wheel assembly; and,
   (b) a second rod member pivotally coupled to and extending between said connecting plate and said wheel assembly;
   said first and second rod members being coupled one to the other, each said rod member having formed therea- long an inner side coupling portion, each said inner side coupling portion including a plurality of projecting walls and at least one groove defined therebetween, said inner side coupling portion of said first rod member slidably engaging said inner side coupling portion of said second rod member.

* * * * *